United States Patent [19]

Morgan et al.

[11] Patent Number: 4,858,988

[45] Date of Patent: Aug. 22, 1989

[54] VEHICULAR WINDOW ASSEMBLY

[75] Inventors: Cleon C. Morgan; Keith A. Nieboer, both of Holland, Mich.

[73] Assignee: Donnelly Corporation, Holland, Mich.

[21] Appl. No.: 183,696

[22] Filed: Apr. 19, 1988

[51] Int. Cl.[4] ............................................. B60J 1/02
[52] U.S. Cl. ................................... 296/201; 296/206; 296/84.1; 296/96.21; 296/93; 52/717.1; 49/485
[58] Field of Search ..................... 296/84.1, 96.21, 201, 296/206, 146, 93; 52/208, 211, 716, 717; 49/484, 485

[56] References Cited

U.S. PATENT DOCUMENTS

| | | | |
|---|---|---|---|
| 1,763,603 | 6/1930 | Donahue | 296/93 |
| 2,034,875 | 3/1936 | Menton | 296/92 |
| 2,556,775 | 6/1951 | Oswald | 52/208 |
| 3,263,014 | 7/1966 | Deisenroth | 264/261 |
| 3,343,867 | 9/1967 | Couch et al. | 296/97 |
| 3,473,476 | 11/1969 | Kemp | 52/208 |
| 3,564,773 | 2/1971 | Bonnaud | 49/488 |
| 3,641,707 | 2/1972 | Kellos | 49/462 |
| 3,705,470 | 12/1972 | Kent | 52/208 |
| 3,759,004 | 9/1973 | Kent | 52/400 |
| 3,806,188 | 4/1974 | Tantlinger | 296/146 |
| 3,843,982 | 10/1974 | Lane et al. | 52/208 X |
| 4,093,304 | 6/1978 | Ziegler | 52/403 X |
| 4,139,234 | 2/1979 | Morgan | 52/208 X |
| 4,363,191 | 12/1982 | Morgan | 49/381 |
| 4,364,214 | 12/1982 | Morgan et al. | 52/311 |
| 4,488,753 | 12/1984 | Koike | 52/208 X |
| 4,591,203 | 5/1986 | Furman | 296/201 |
| 4,662,113 | 5/1987 | Weaver | 49/404 |

FOREIGN PATENT DOCUMENTS

| | | |
|---|---|---|
| 76924 | 9/1982 | |
| 1813706 | 6/1970 | Fed. Rep. of Germany . |
| 3333672 | 4/1985 | Fed. Rep. of Germany . |
| 2520428 | 7/1983 | France ................................. 52/208 |
| 1351271 | 4/1974 | United Kingdom ................ 52/400 |
| 2047785 | 12/1980 | United Kingdom ................ 296/93 |
| 2132130 | 7/1984 | United Kingdom . |
| 2147244 | 5/1985 | United Kingdom . |

OTHER PUBLICATIONS

Use of the RIM Process for Producing Modular Window Assemblies for the Ford Motor Company, Excel Industries, Inc., Sep. 23, 1981.
Ford Engineering Material Specification, "Adhesion Primer, Painted Metal—For One Component Urethane Adhesive", Specification Number VESB-M2G234-A, ESB-M2G234-B.
Exhibit A—Prior Windshield/Vehicle Body Assembly from Ford Motor Company.

Primary Examiner—Dennis H. Pedder
Attorney, Agent, or Firm—Price, Heneveld, Cooper, DeWitt & Litton

[57] ABSTRACT

A vehicular window assembly such as a front windshield in the preferred embodiment includes a window panel and a casing molded on a first portion of the peripheral edge of the window panel. A trim strip covers and finishes portions of the periphery of the assembly. The trim strip extends continuously without interruption from the window panel edge to a mounting rib on the casing through a transition area. The trim continues along the casing and is spaced from the window panel edge. When installed, the casing and trim strip fill the space between the window panel and vehicle body to reduce wind noise when the vehicle is moving and improve weather sealing around the window.

37 Claims, 3 Drawing Sheets

VEHICULAR WINDOW ASSEMBLY

BACKGROUND OF THE INVENTION

This invention relates to window assemblies for vehicles such as automobiles, trucks and the like and, more particularly, to vehicular window assemblies which include molded casings and trim assemblies for covering and finishing the space around and between the window assembly and the vehicle body.

Many recent vehicle designs have included contoured body panels for reducing wind resistance to improve fuel economy while driving. Various of the contoured body panels such as those on doors or other hinged body parts have included edges which extend around and over the edges of adjacent body panels or window areas such as roofs and windshields. For example, recent designs have included contoured doors which curve forwardly from the door adjacent the side edge of the front windshield and inwardly toward the roof panel. Such contours in the vehicle body create gaps and spaces, especially around windows. In the case of the front door edge which is spaced outwardly of each side of the front windshield, forward movement of the vehicle at speed creates significant wind/air pressure and/or turbulence in the space between the windshield and door edge. Consequently, wind noise results. Such spaces can also trap water or debris and lead to water leakage around the windshield and door edge. In addition, such spaces and gaps impair the appearance of the vehicle.

Accordingly, a need was apparent for an improved vehicle body/window design which would reduce and/or eliminate the significant gaps or spaces between window assemblies such as the front windshield and vehicle body portions such as the front door edge to avoid the wind noise and weather sealing problems noted above while improving the vehicle appearance without restricting assembly or installation of the window or affecting operation of the door or other functional features of the vehicle.

SUMMARY OF THE INVENTION

Accordingly, the present invention provides a vehicular window assembly which is adapted to be fitted over and close an opening in a vehicular body, especially a windshield opening in the front of a vehicle, while simultaneously filling and covering the space between the window panel and the vehicle body to reduce wind noise when the vehicle is in motion, to improve weather sealing around the window, and to improve the appearance of the vehicle body around the window, especially in highly contoured vehicle bodies designed for reduced wind resistance and improved fuel economy.

In one form, the invention is a vehicular window assembly having a sheet-like window panel with a peripheral edge, a casing molded from resinous plastic material around a first portion of the peripheral edge of the window panel and trim means for covering and finishing at least portions of the periphery of the assembly including a second portion of the peripheral edge of the window panel. The casing includes a mount for mounting the trim therealong. The casing and trim include a transition area for extending the trim continuously without interruption from the second portion of the window panel peripheral edge to the mount on the casing. When assembled with a vehicle body, the casing and trim fill spaces between the window panel and body such that wind noise is reduced when the vehicle is in motion and weather sealing is improved.

In a preferred embodiment, the trim extends along three sides of the window panel and includes a continuous, rigid channel member joined to a continuous finishing strip. The channel member includes flanges forming a channel opening adapted to be fitted over and receive therewithin a rib molded on the casing. The finishing strip includes a flexible, resilient sealing flange for engaging the vehicle body when the window assembly is installed and a connecting flange received in a restricted opening formed by a retaining flange on the base of the channel member. Preferably, the outer flange of the channel member is exposed for decorative purposes along the assembly.

In yet other aspects, the transition area allowing the trim to extend from the peripheral edge of the window onto the casing includes a molded rib on the casing which begins at a position approximately flush with the outer surface of the window and slopes away from the window surface to a position spaced from that surface in a direction extending along the peripheral window panel edge. The outer flange of the trim channel member engages the window edge and follows the outer surface of the molded rib on the casing such that the trim also slopes away from the window panel surface as it extends along the casing. The inner flange of the trim channel member adjacent the transition area is cut away to allow continuous attachment of the trim to the rib through the transition area.

The casing itself includes a filler body which increases in thickness from the window panel surface to a position adjacent the vehicle body and an encapsulating portion which extends around and envelopes the peripheral edge of the window panel to hold the casing in place.

When combined with a vehicle body, the casing and trim together fill and close the space between the vehicle body edge and the peripheral edge of the window panel thereby closing any gaps or spaces which otherwise would create air turbulence and wind noise when the vehicle is in motion. Weather sealing around the window is also improved. Moreover, the casing and trim provide a molded contour which blends with the contoured shape of the vehicle body panels to improve the overall appearance of the vehicle especially around the window opening. Further, since the trim assembly includes a flexible, resilient finishing strip adjacent the assembly periphery, the door edge can engage the resilient finishing strip to effectively close and seal the space between the door edge and window without affecting the function of the door or requiring the addition of sealing parts to the door. Further, such covering and sealing is accomplished while providing a decorative trim and outline for the window assembly and while maintaining the contoured shape for reduced wind noise and resistance around the window opening.

These and other objects, advantages, purposes and features of the invention will become more apparent from a study of the following description taken in conjunction with the drawings.

DESCRIPTION OF THE PREFERRED EMBODIMENTS

Figure 1:
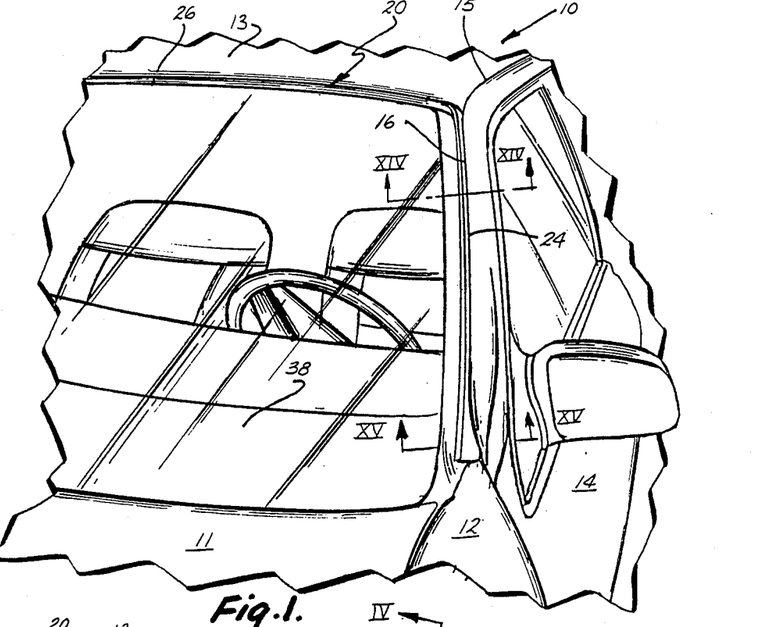
FIG. 1 is a fragmentary, perspective view of the front and left side of a vehicle showing the window assembly of the present invention in the form of a windshield installed in a vehicle.
Figure 2:
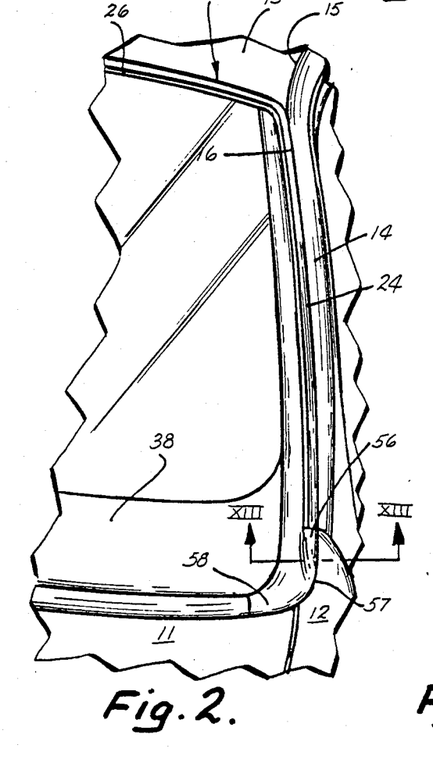
FIG. 2 is a fragmentary, perspective view of the roof support pillar area of the vehicle in FIG. 1 illustrating the window assembly as installed.
Figure 3:
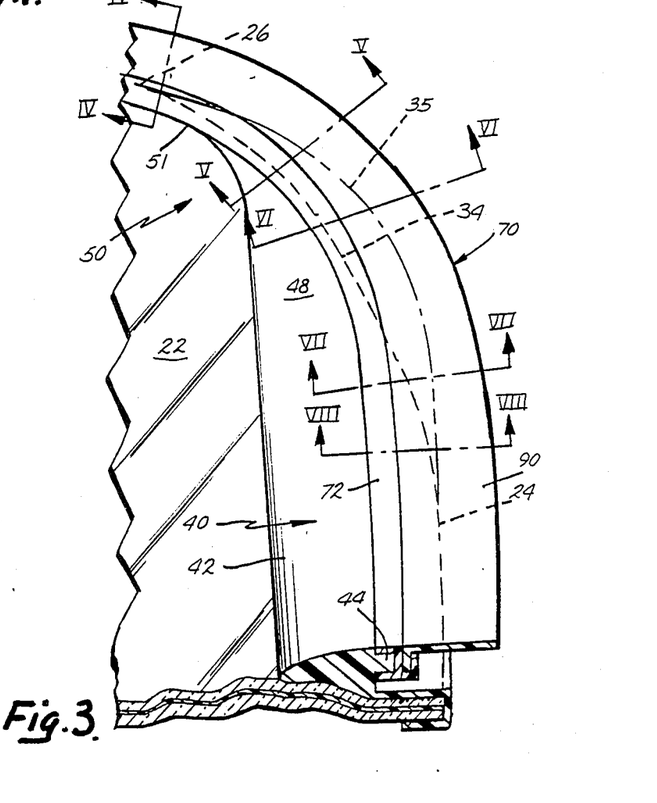
FIG. 3 is a fragmentary, perspective view of the upper left corner of the window assembly of the present invention illustrating the transition area where the trim strip extends from the window panel edge onto the molded casing.
Figures 12, 13, 14, 15:
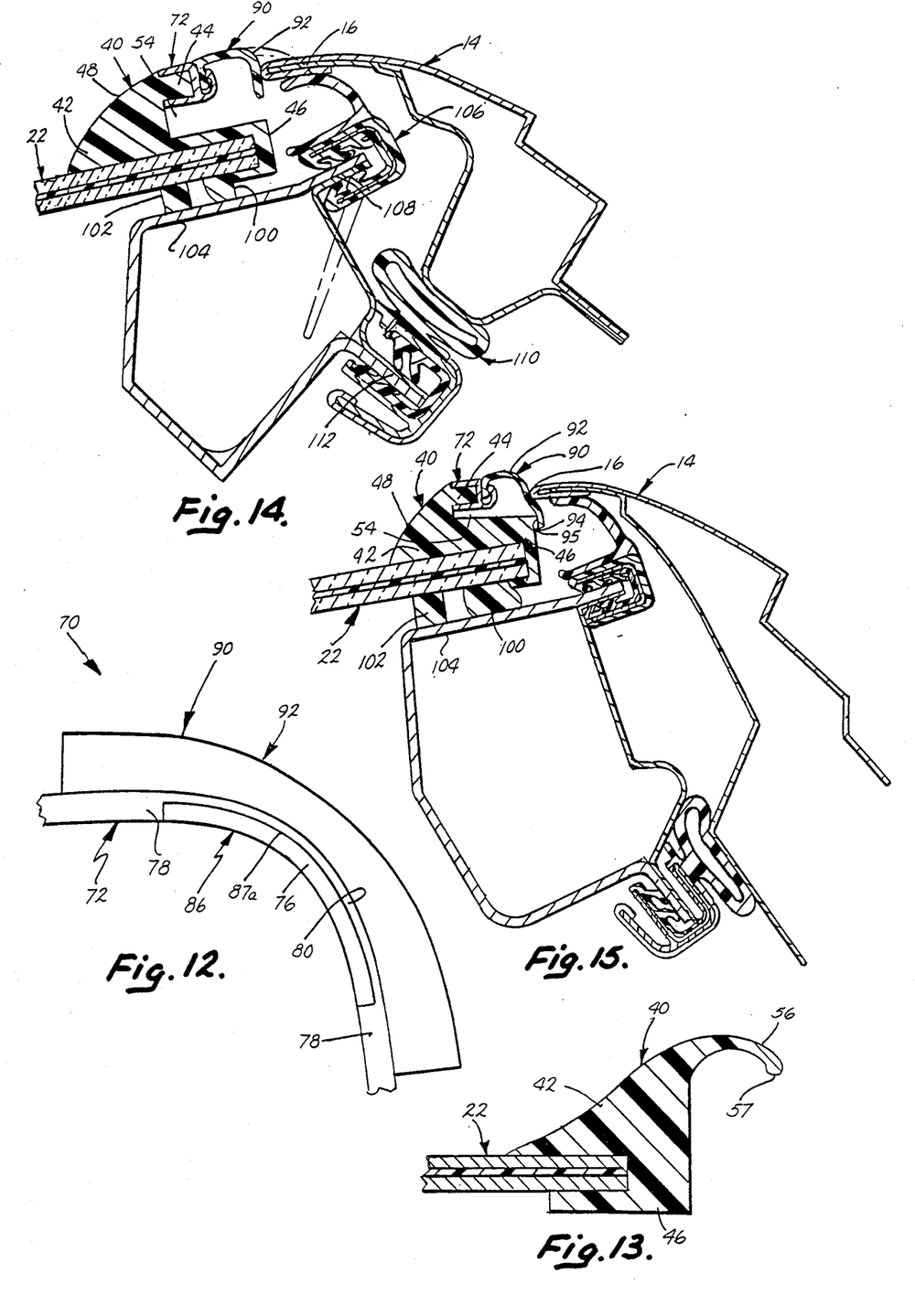
FIG. 12 is a fragmentary rear plan view of the transition area of the trim strip assembly prior to installation on the window panel and casing of the present invention.
FIG. 13 is a fragmentary, sectional view of the lower end of the casing of the window assembly taken along line XIII—XIII of FIG. 2.
FIG. 14 is a fragmentary, sectional view of the window assembly of the present invention, an upper section of the roof support pillar, and a portion of the door panel of the vehicle of FIG. 1 taken along line XIV—XIV of FIG. 1.
FIG. 15 is a fragmentary, sectional view of the window assembly of the present invention, a lower section of the roof support pillar, and a portion of the door panel of the vehicle of FIG. 1 taken along line XV—XV of FIG. 1.

Referring now to the drawings in greater detail, FIGS. 1-3 illustrate a vehicle 10 such as a passenger automobile including a vehicular window assembly 20 incorporating the present invention. Vehicle 10 is of the type having contoured body portions and panels such as hood 11, left front fender 12, roof 13 and door 14. Many present day vehicles such as that shown at 10 include such contoured panels for reduced wind resistance and increased fuel economy. In vehicle 10, the top door edge 15 and upper front door edge 16 are curved and contoured to blend into the contour of roof 13 and to wrap slightly around the roof support pillar 104 as is best seen in FIGS. 14 and 15. Window assembly 20 is preferably a windshield installed over an opening in the front of the vehicle 10 such that its top edge 26 lies adjacent the front of roof 13 and its lateral side edges 24 adjacent the upper front door edge 16 as shown in FIGS. 1 and 2. As will be more fully explained below, window assembly 12 includes a combined molded casing/trim strip assembly which fills the gaps and spaces between the contoured body portions or panels and the window assembly, especially in the front of the vehicle, to reduce wind noise and improve weather sealing while simultaneously enhancing appearance.

As is best seen in FIG. 3, windshield/window assembly 20 includes a sheet-like window panel 22, a pair of separate, molded casings 40, one extending along each of the lateral side edges 24 of the window panel 22, and a continuous trim strip assembly 70 which mounts along top 26 of window panel 22 and extends downwardly along either lateral side edge 24 of the windshield such that three sides of the windshield are covered and finished by the trim strip assembly. Trim strip 70 includes both a rigid channel member 72 and finishing strip 90.

Sheet-like window panel 22 is transparent and preferably is formed from conventional laminated safety glass. Panel 22 includes a pair of transparent, soda lime glass sheets 28, 30 which are laminated together by a polyvinyl butyral (PVB) interlayer through the use of heat and pressure in a known manner. Typically, laminated glass panel 22 has a thickness of approximately 0.215 inches with each glass sheet being approximately 0.093 inches thick. The PVB interlayer may be approximately 0.030 inches thick prior to assembly but is compressed slightly during lamination.

Figures 8, 9, 10, 11:
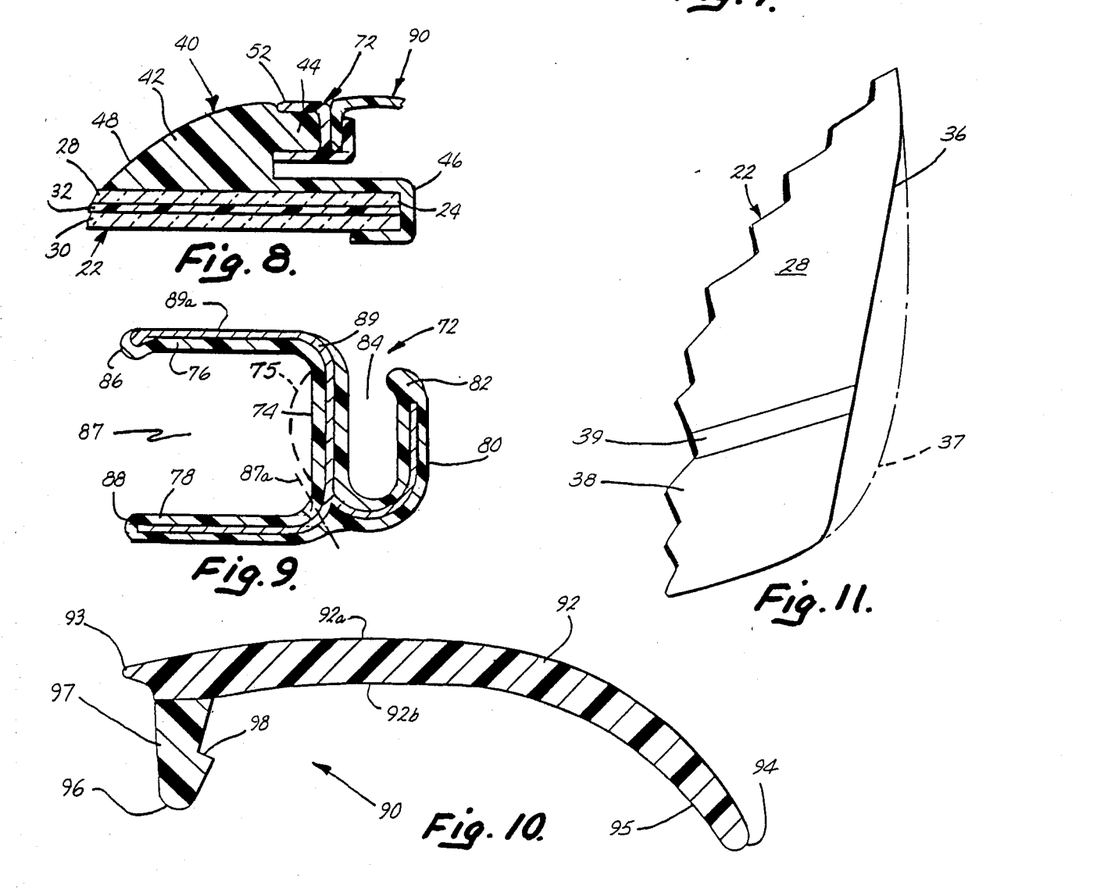
FIG. 8 is a fragmentary, sectional view of the window assembly in the transition area taken along line VIII—VIII of FIG. 3.
FIG. 9 is an enlarged, sectional view of the rigid channel member forming one portion of the trim strip assembly incorporated in the window assembly of the present invention.
FIG. 10 is an enlarged, sectional view of the finishing strip forming a second portion of the trim strip assembly incorporated in the window assembly of the present invention.
FIG. 11 is a fragmentary, plan view of a lower corner of the window panel incorporated in the window assembly of the present invention.

As shown in FIGS. 3 and 11, the corners of panel 22 are trimmed or truncated to allow a proper fit within the mold used to form casings 40 along lateral side edges 24. The upper corners of panel 22 are trimmed along line 34 from the normal rounded configuration shown in phantom at 35. The lower corners are trimmed along line 36 from the normal rounded configuration shown in phantom at 37. Such truncated corners allow ejector and sealing parts within the mold to be received adjacent the glass edge for proper formation of casing 40, especially at the upper and lower corners of the glass as described below. In addition, glass panel 22 may include painted or coated areas 38, 39 along its lower edge to cover and hide assembled portions of the instrument panel when the windshield is installed in a vehicle as shown in FIGS. 1 and 2. Of course, materials other than laminated safety glass could be used including tempered glass, plastic sheeting or the like.

With reference to FIGS. 3-8 and 13-15, molded casings 40 are shown in greater detail. Preferably, casings 40 are formed from reaction injected molded (RIM) polyurethane after coating the top, bottom and peripheral edge surfaces of lateral sides 24 of glass plane 22 with an appropriate urethane adhesion promoting primer. RIM polyurethane is made from constituents which are injected into a suitable mold (not shown) from two or more constituent sources through a high pressure mixing apparatus (not shown) by conventionally known metering devices (not shown). A polyol resin constituent, an isocyanate constituent, and a catalyst blended with the polyol are combined. An example of commercially available polyol resins blended with a catalyst and useful in such molding is that manufactured by Dow Chemical Company under the trademark Spectrim - 5B. An example of a commercially available isocyanate is that produced by Dow Chemical Company under the trademark Spectrim - 5A. A suitable adhesion promoting primer is a urethane adhesive of the type specified by Lord Chemical Company of Erie, Pa. under Product No. AP-134 or specified in Ford Motor Company specification ESB-M2G234-A or B.

Each casing 40 includes a filler body 42, a mounting rib 44 for receiving trim strip assembly 70, and an encapsulation portion 46. Filler body 42 extends from top corner 34 of window panel 22 at a transition area 50 along the outer surface of outer glass sheet 28 adjacent lateral side edges 24. As shown in FIGS. 5-8, the thickness of filler body 42 increases from area 51 where the casing is substantially flush with the outer surface of glass sheet 28 progressively through transition area 50 to lateral side edge 24. Similarly, filler body 42 tapers from its full thickness in a lateral direction transverse to the glass periphery to the outer glass surface and includes a curved, slightly convex exterior surface 48 therealong. The thickness of filler body 42 helps to fill and cover gaps or spaces between the window panel 22 and the surrounding vehicle body portions to prevent wind noise while improving weather sealing and appearance along the window assembly edges.

As is also seen in FIGS. 3-8, a continuous mounting rib 44 is molded integrally with filler body 42 from the RIM polyurethane material and extends continuously along the outer periphery of the filler body. Mounting rib 44 begins as a recessed surface 52 at the upper end 51 of transition area 50 and curves along and over corner edge 34 of window panel 22 and then downwardly at a position spaced inwardly from peripheral side edge 24 of the window panel. Outer surface 52 of rib 44 is spaced slightly below and offset from surface 48 of filler body 42 adjacent the rib such that the thickness of the rigid channel member 72 is received and positioned generally flush with the outer surface 48 of the casing. As the thickness of filler body 42 increases through transition area 50, top surface 52 of rib 44 slopes away from the outer surface of window panel 22 as it progresses away from end 51 of transition area 50 where it contacts the outer glass surface. Eventually, as shown in FIGS. 6-8, 14 and 15, rib 44 is spaced from encapsulating portion 46 of casing 40 sufficiently by space 54 to receive rigid channel member 72 around three sides of the sectional configuration of rib 44.

FIGS. 3 and 5-8 also illustrate encapsulation portion 46 which extends around peripheral edge 24 of window panel 22 and is adhered to the glass surfaces therearound by the adhesion promoting primer to retain casing 40 on the window panel. Encapsulation portion 46 extends outwardly of the periphery of the assembly to successively greater distances as it extends through transition area 50 such that laminated window panel 22 entirely underlies mounting rib 44, trim strip assembly 70 and space 54 along the majority of the casing 40 as shown in FIGS. 3, 14 and 15.

As shown in FIGS. 2, 3 and 13, trim strip assembly 70 terminates at 56 adjacent lower truncated corner 36 of the window panel 22 where casing 40 increases in lateral width to cover the increased space or gap between the front fender 12 and the window assembly. In addition, the lower end 58 of the assemby curves around lower corner 36 and extends a slight distance along the lower edge of the window panel (FIG. 2) to cover a portion of the space between the rear edge of hood panel 11 and the window assembly. As shown in FIGS. 13 and 15, the widened portion of casing 40 adjacent terminal point 56 of trim strip assembly 70 forms a sealing flange which curves outwardly to a free end 57 adjacent front fender 12.

Referring now to FIGS. 3-10 and 12, trim strip assembly 70 includes two major portions, namely, a rigid channel member 72 and a finishing strip 90. As is best seen in FIGS. 3 and 9, rigid channel member 72 includes a continuous base 74, an outer flange 76 extending substantially perpendicularly to base 74 at one end, and an inner flange 78 at the opposite end of base 74 at a position spaced from flange 76. Inner flange 78 extends substantially parallel to outer flange 76 and is also generally perpendicular to base 74. Extending oppositely from base 74 is a retaining flange 80 which curves upwardly from the lower outside surface of base 74, extends generally parallel to base 74, and terminates at an enlarged free end 82. End 82 defines a restricted opening or slot 84 which opens laterally intermediate flange 80 and the outside surface of base 74. Similarly, outer and inner flanges 76, 78 respectively terminate in free ends 86, 88. Free end 86 of flange 76 is enlarged in a bulbous area to define a restricted opening 87 to the channel opening between the flanges 78, 78 which aids in retention of channel member 72 on mounting rib 44.

Preferably, rigid channel member 72 is extruded from a metal such as aluminum or the like. It includes a core 89 interior of a resinous plastic coating such as polyvinyl chloride which envelopes and encapsulates core 89 except for the outer surface 89a at the exterior of flange 76. Metallic surface 89a is thus exposed for decorative purposes along the length of trim strip 70.

As shown in FIGS. 9 and 12, the rear side of channel member 72 includes cutaway areas 86 at each upper corner of the window assembly. Cutaway portions 86 are formed by removing inner flange 78 along the inner end of flange 78 at line 87a (FIG. 9) through approximately the 90 degrees of the corner where channel member 72 changes direction from the top to the side of the window. Cutaway area 86 accommodates transition area 50 from the glass surface to casing 40 such that the upper flange 76 of channel member 72 can follow the upper surface 52 of mounting rib 44 from a position flush with the outer glass surface, along an incline away from the glass surface and then along the filler body 42 as shown in FIGS. 4-8. Removal of inner flange 78 in area 86 prevents the channel member from being obstructed by the edge of glass panel 22 as the channel member follows the mounting rib continuously from the glass surface along the outer surface of the rib.

Finishing strip 90, which cooperates and mates with channel member 72 and forms the second major component of trim strip assembly 70 (FIGS. 3-8 and 10), includes a resilient, flexible sealing flange 92 having an outer surface 92a with a slightly convex configuration in its normal, unflexed position. Flange 92 extends from an inner edge 93 to an outer free edge 94 and is sufficiently flexible to bend and flex when engaged by portions of the vehicle body such as door edge 16 when closed as shown in FIGS. 14 and 15. Sealing strip 92 not only covers the gap or space between channel member 72 on casing 40 and adjacent vehicle body portions, but can also flex to form an improved weather seal in those areas or gaps.

Extending along the entire inner surface 92b of sealing strip 92 adjacent inner edge 93 is a short connecting flange 96. Connecting flange 96 extends generally at a right angle to the plane of sealing flange 92 where the two flanges interconnect. Flange 96 has a continuous shoulder 98 extending along its outside surface forming a necked-down area 97 and an enlarged area therebelow for engagement with enlarged end 82 of retaining flange 80 when flange 96 is received in retaining opening 84 in the rigid channel member. As will be understood from FIGS. 3-8, finishing strip 90 is joined to rigid channel member 72 by pressing connecting flange 96 into opening 84 until shoulder 98 is caught under enlarged free end 82 in restricted opening 84 to resist removal of the flange. In such position, the exterior surface 92a of sealing flange 92 adjacent inner edge 93 extends substantially parallel to the surface of filler body 42 on casing 40, to outer surface 92 of channel member 72 as shown in FIGS. 4-8, and to outer glass surface 28. As will also be seen from FIG. 12, sealing strip 92 has a reduced width along top edge 26 of the window panel and where it extends around the corner of the window panel 22 adjacent transition area 50 of the assembly and cutout area 86. The reduced width prevents excessive inward curling of the free end edge 94 of the sealing flange as it rounds that corner.

Preferably, finishing strip 90 is formed from an EPDM/vulcanized rubber mixture having properties similar to vulcanized rubber but capable of being procesesd like a thermoplastic resinous material such as "Santoprene" (trademark) available from the Monsanto Company of St. Louis, Mo. Finishing strip 90 is coextruded with two different types of Santoprene material in the preferred embodiment such that sealing flange 92 has a Shore "A" hardness of 73 to provide sufficient flexibility and resiliency for covering and sealing the spaces between the window assembly and vehicle body. Connecting flange 96 has a Shore "A" hardness of 95 for toughness and wear resistance for retaining the finishing strip in channel member 72. In addition, rigid channel member 72 is preferably obtained from Rehau Plastics Inc. of Leesburg, Va. under Product No. E80B-5403682.

Figure 4:
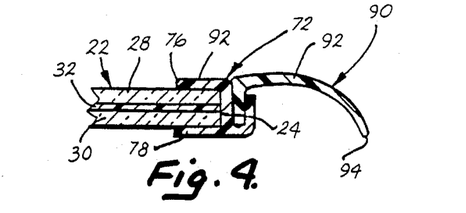
FIG. 4 is a fragmentary, sectional view of the window assembly in the transition area taken along line IV—IV of FIG. 3.
Figure 5:
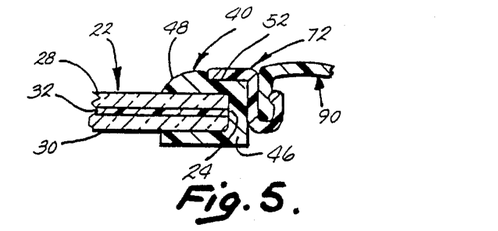
FIG. 5 is a fragmentary, sectional view of the window assembly in the transition area taken along line V—V of FIG. 3.
Figure 6:
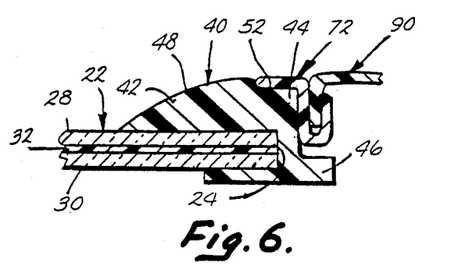
FIG. 6 is a fragmentary, sectional view of the window assembly in the transition area taken alone line VI—VI of FIG. 3.
Figure 7:
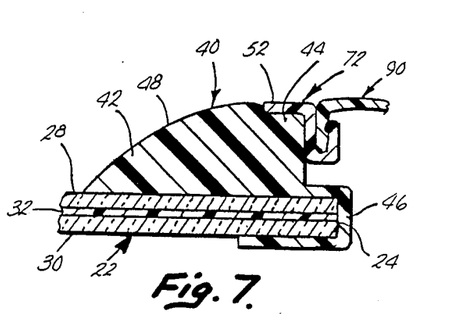
FIG. 7 is a fragmentary, sectional view of the window assembly in the transition area taken along line VII—VII of FIG. 3.

To complete manufacture of the window assembly 20, a preassembled, U-shaped length of trim strip assembly 70 with finishing strip 90 pressed into restricted opening 84 in rigid channel member 72 via connecting flange 96 is first pressed directly onto the uncovered peripheral edge of window panel 22 along the top 26 of the window panel. As shown in FIG. 4, the uncovered peripheral window panel edge 24 is received in the channel opening 87 of channel member 72 between flanges 76, 78 such that edge 24 abuts the inside surface of base 74 and the trim strip encapsulates edge 24. Upper flange 76 is thus exposed on the top outer surface of window panel 22 such that metallic core 89 has surface 89a exposed for decoration along the upper edge of the window assembly. Rigid channel member 72 with finishing strip 90 thereon is next pressed onto the glass periphery adjacent transition area 50 which begins at 51. Since inner flange 78 is cut away at 86 in this area, outer flange 76 may follow the outer surface 52 of mounting rib 44 without restriction by the inner flange as it slopes away from the glass surface as shown in FIG. 5. Outer flange 76 follows outer rib surface 52 as the thickness of filler body 42 of casing 40 increases as shown in FIGS. 5, 6 and 7. As shown in FIG. 8, immediately after the end of transition area 50 and after the cutaway area 86 on inner flange 78 terminates, inner flange 78 continues and mounting rib 44 is received in the channel opening 87 between flanges 76, 78 at a position spaced above the outer glass surface by space 54. Rigid channel 72 continues along the lateral side edge 24 of the window assembly on rib 44 to an area adjacent the lower corner where it terminates and casing flange 56 begins as shown in FIG. 2. Accordingly, rigid channel member 72 progresses from direct contact with the peripheral glass panel edge 26 onto casing 40 in a continuous, uninterrupted manner through transition area 50 at both upper corners such that outer flange 76 follows the slightly recessed mounting rib 44 along the slope provided in the increasing thickness of the casing to the lateral side edge of the assembly. As shown in FIGS. 5-8, outer surface 89a of flange 76 is substantially flush with the outer surface of casing 40.

An adhesive material may be included within channel opening 87 of rigid channel member 72 prior to assembly by placing a bead 75 of the material along the inside surface of base 74. When channel member 72 is pressed onto the glass or mounting rib 44 of casing 40 the adhesive will engage the peripheral glass edge or outer periphery of mounting rib 44 to help retain the channel member in place and provide an additional weather seal. Urethane adhesives are suitable for this purpose.

Following assembly of the trim strip 70 to the glass panel 22 with molded casings 40 thereon, the entire window assembly 20 is secured in position over the front windshield opening of the vehicle body by a bead of adhesive 100 together with a seal or spacer 102 both of which are placed between the window assembly and the surrounding vehicle body surface including a vehicle body support including roof support pillar 104 which slopes upwardly and rearwardly between fender 12 and roof 13 (FIGS. 14 and 15). Upper front door edge 16, when closed, engages exterior surface 92a of sealing strip 92 along the entire lateral side 24 of the window assembly and presses the sealing strip inwardly. The natural resiliency of the sealing strip urges the strip outwardly against door edge 16 to provide an improved weather seal against the entry of water, dirt and the like. Although not forming a part of the present invention, it will be understood that the door pillar 104 supports additional sealing strips such as sealing assembly 106 on pinchweld flange 108 as well as sealing assembly 110 on pinchweld flange 112. Sealing assemblies 106, 110 provide additional barriers to entry of water and the like against interior portions of the door.

As will now be understood, the window assembly including trim strip asembly 70 finishes and covers the space between the window assembly and the vehicle body around the windshield opening as shown in FIGS. 1, 2, 14 and 15. At the top of the window, finishing strip 90 extends upwardly and overlaps the front of roof 13. At the lateral sides of the window assembly, the thickness of filler body 42 substantially fills the space between the outer surface of the window panel and the inwardly curved, contoured door edge 16 while the flexible, resilient sealing strip engages the door edge to complete the closing of the space. The result is a substantially smooth surface exposed to the wind and air when the vehicle is in motion which reduces air turbulence around the door edge, reduces wind noise resulting therefrom, and improves the weather seal around the window and the appearance of the window assembly on the vehicle. In addition, window assembly 20 allows the door to open and close and properly engage the finishing strip.

As shown in FIG. 15, inside surface 95 of finishing strip 90 adjacent the outer edge 94 may be mechanically secured to the outer periphery of encapsulating portion 46 near the lower end of the finishing strip such as by a staple or screw to hold the finishing strip in and prevent it from protruding out or overlapping over the door edge when the door is closed.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

Of course, the invention may also be used for window assemblies in vehicles other than front windshields. Thus, side and rear windows may also be made in this manner.

The embodiments of the invention in which an exclusive property or privilege is claimed are defined as follows.

1. A vehicular window assembly for installation in a vehicle comprising:
   a sheet-like window panel having a peripheral edge;
   a casing, including an outer surface, molded from resinous plastic material on a first portion of said peripheral edge of said window panel; and
   trim means for covering and finishing at least portions of the periphery of the assembly including a second portion of said peripheral edge of said window panel;
   said casing including mounting means for mounting said trim means therealong;
   said casing and trim means including transition means for extending said trim means in one piece without interruption from said second portion of said peripheral window panel edge where said trim means encapsulates said window panel edge to said mounting means on said casing where said trim means is spaced from said window panel, said casing and trim means adapted to fill spaces between said window panel and the body of the vehicle in which said window assembly is mounted thereby wind noise is reduced when the vehicle is in motion and weather sealing is improved.

2. The assembly of claim 1 wherein said mounting means include a rib on said casing extending in a direction outwardly and away from said peripheral edge of said panel; said trim means including flange means defining a channel for receiving said rib and retaining said trim means on said rib.

3. A vehicular window assembly for installation in a vehicle comprising:
   a sheet-like window panel having a peripheral edge;
   a casing, including an outer surface, molded from resinous plastic material on a first portion of said peripheral edge of said window panel; and
   trim means for covering and finishing at least portions of the periphery of the assembly including a second portion of said peripheral edge of said window panel;
   said casing including mounting means for mounting said trim means therealong;
   said casing and trim means including transition means for extending said trim means in one piece without interruption from said second portion of said peripheral window panel edge where said trim means encapsulates said window panel edge to said mounting means on said casing where said trim means is spaced from said window panel, said casing and trim means adapted to fill spaces between said window panel and the body of the vehicle in which said window assembly is mounted whereby wind noise is reduced when the vehicle is in motion and weather sealing is improved;
   said mounting means including a rib on said casing extending in a direction outwardly and away from said peripheral edge of said panel; said trim means including flange means defining a channel for receiving said rib and retaining said trim means on said rib;
   said transition means including an outer surface on said rib which begins at a first position at the outer surface of said window panel and extends at an incline from said outer window panel surface to a second position spaced from said outer window panel surface in a direction along said first portion of said peripheral edge of said window panel; said flange means engaging said second portion of said peripheral edge of said window panel and following said rib outer surface on said casing such that said trim means is spaced from said window panel surface as it extends along said casing.

4. The assembly of claim 3 wherein said flange means include outer and inner flanges, said inner flange being cut away from a predetermined distance along said trim means adjacent said first position whereby said outer flange and trim means can follow said rib outer surface away from said window panel surface without obstruction by said inner flange.

5. The assembly of claim 4 wherein said rib is spaced slightly below said outer surface of said casing; said outer flange of said flange means being positioned and exposed adjacent said outer surface of said casing.

6. The assembly of claim 2 wherein said rib is spaced slightly below said outer surface of said casing; a portion of said flange means being positioned and exposed adjacent said outer surface of said casing.

7. The assembly of claim 2 wherein said trim means includes adhesive means interior of said flange means for helping retain said trim means on said second portion of said peripheral window panel edge and on said mounting means.

8. The assembly of claim 1 wherein said trim means includes a continuous, rigid channel member joined to a continuous, finishing strip, said channel member being mounted on said mounting means and said finishing strip extending outwardly from said channel member and away from said peripheral edge of said window panel.

9. A vehicular window assembly for installation in a vehicle comprising:
   a sheet-like window panel having a peripheral edge;
   a casing molded from resinous plastic material on a first portion of said peripheral edge of said window panel; and
   trim means for covering and finishing at least portions of the periphery of the assembly including a second portion of said peripheral edge of said window panel;
   said casing including an outer surface and mounting means for mounting said trim means therealong;
   said casing and trim means including transition means for extending said trim means in one piece without interruption from said second portion of said peripheral window panel edge where said trim means encapsulates said window panel edge to said mounting means on said casing where said trim means is spaced from said window panel, said casing and trim means adapted to fill spaces between said window panel and the body of the vehicle in which said window assembly is mounted whereby wind noise is reduced when the vehicle is in motion and weather sealing is improved;

said trim means including a continuous, rigid channel member joined to a continuous, finishing strip, said channel member being mounted on said mounting means and said finishing strip extending outwardly from said channel member and away from said peripheral edge of said window panel;

said channel member including a base, an outer flange extending inwardly of said peripheral edge from said base and exposed adjacent said outer surface of said casing, an inner flange on said base at a position spaced from said outer flange and also extending inwardly of said peripheral edge from said base, and a retaining flange extending away from said outer and inner flanges on said base, said retaining flange having a free end defining a slot having a restricted opening with portions of said base for retaining said finishing strip therein.

10. The assembly of claim 9 wherein said finishing strip includes an elongated, flexible, resilient sealing flange and a connecting flange adjacent one edge of said sealing flange, said connecting flange being received in said restricted opening of said channel member to retain said finishing strip on said channel member.

11. The assembly of claim 10 wherein said connecting flange includes a necked-down area defined by a protruding shoulder; said retaining flange including a widened area at said free end; portions of said connecting flange including said shoulder being received in said slot such that withdrawal is resisted by said widened free end of said retaining flange.

12. The assembly of claim 11 wherein said outer flange is approximately parallel to the outer surface of said window panel and said base is at a right angle to said outer flange, said retaining flange extending generally parallel to and spaced from said base with said slot opening laterally of said channel member; said connecting flange extending approximately at a right angle to said sealing flange such that said sealing flange lies approximately parallel to said outer flange where said finishing strip joins said channel member.

13. The assembly of claim 9 wherein said channel member is a composite including a metallic core coated with a resinous, polymeric material on all surfaces except the outer side of said outer flange which is exposed for decorative purposes.

14. The assembly of claim 9 wherein said channel member includes a channel opening leading to a channel and receiving said mounting means, said channel opening being defined by free ends on said outer and inner flanges, said outer flange free end including a bulbous area defining a restriction to said channel opening for helping retain said channel member on said mounting means.

15. The assembly of claim 14 wherein said mounting means includes a protruding rib on said casing, said channel member receiving said rib in said channel.

16. The assembly of claim 8 wherein said channel member includes adhesive means on the interior thereof for helping retain said channel member on said second portion of said peripheral window panel edge and on said mounting means.

17. The assembly of claim 1 wherein said casing includes a filler body on the outer surface of said window panel and an encapsulating portion extending around and enveloping said peripheral edge of said window panel.

18. The assembly of claim 17 wherein said filler body begins at a first position along said peripheral edge at said outer window panel surface and increases in thickness as said filler body extends along said first portion of said window panel peripheral edge.

19. The assembly of claim 17 wherein said filler body tapers toward said outer surface of said window panel in a direction approximately normal to said peripheral edge of said window panel.

20. The assembly of claim 17 wherein said mounting means include a rib on said casing extending in a direction outwardly and away from said periperal edge of said panel; said trim means including flange means defining a channel for receiving said rib and retaining said trim means on said rib.

21. The assembly of claim 20 wherein said rib is spaced slightly below said outer surface of said casing; a portion of said flange means being positioned and exposed adjacent said outer surface of said casing.

22. A vehicular window assembly for installation in a vehicle comprising:
a window panel having a peripheral edge;
a casing, including an outer surface, molded from resinous plastic material on a first portion of said peripheral edge of said window panel;
an elongated, rigid channel member encapsulating and extending along a second portion of said peripheral window panel edge to a transition area where said channel member extends in one piece without interruption onto said casing and is spaced from said window panel, said channel member extending further along at least a portion of said casing where said channel member is also spaced from said window panel; and
a finishing strip mounted on and extending along and outwardly away from said channel member;
said casing, channel member and finishing strip adapted to fill spaces between said window panel and the body of the vehicle in which said window assembly is mounted whereby wind noise is reduced when the vehicle is in motion and weather sealing is improved.

23. A vehicular window assembly for installation in a vehicle comprising:
a window panel having a peripheral edge;
a casing, including an outer surface, molded from resinous plastic material on a first portion of said peripheral edge of said window panel;
an elongated, rigid channel member mounted on and extending along a second portion of said peripheral window panel edge to a transition area where said channel member extends in one piece without interruption onto said casing, said channel member extending along at least a portion of said casing where said channel member is spaced from said window panel; and
a finishing strip mounted on and extending along and outwardly away from said channel member;
said casing, channel member and finishing strip adapted to fill spaces between said window panel and the body of the vehicle in which said window assembly is mounted whereby wind noise is reduced when the vehicle is in motion and weather sealing is improved;
said channel member including a base, an outer flange extending inwardly of said peripheral edge from said base and exposed adjacent said outer surface of said casing, an inner flange on said base at a position spaced from said outer flange and also extending inwardly of said peripheral edge from said base and a retaining flange extending away from said outer and inner flanges on said base, said retaining flange having a free end defining a slot having a restricted opening with portions of said base for retaining said finishing strip therein.

24. The assembly of claim 23 wherein said finishing strip includes an elongated, flexible, resilient sealing flange and a connecting flange adjacent one edge of said sealing flange, said connecting flange being received in said restricted opening of said channel member to retain said finishing strip on said channel member.

25. The assembly of claim 24 wherein said connecting flange includes a necked-down area defined by a protruding shoulder; said retaining flange including a widened area at said free end; portions of said connecting flange including said shoulder being received in said slot such that withdrawal is resisted by said widened free end of said retaining flange.

26. The assembly of claim 25 wherein said outer flange is approximately parallel to the outer surface of said window panel and said base is at a right angle to said outer flange, said retaining flange extending generally parallel to and spaced from said base with said slot opening laterally of said channel member said connecting flange extending approximately at a right angle to said sealing flange such that said sealing flange lies approximately parallel to said outer flange where said finishing strip joins said channel member.

27. The assembly of claim 23 wherein said channel member is a composite including a metallic core coated with a resinous, polymeric material on all surfaces except the outer side of said outer flange which is exposed for decorative purposes.

28. The assembly of claim 23 wherein said channel member includes a channel opening leading to a channel and receiving a portion of said casing, said channel opening being defined by free ends on said outer and inner flanges, said outer flange free end including a bulbous area defining a restriction to said channel opening for helping retain said channel member on a portion of said casing.

29. The assembly of claim 28 including a protruding rib on said casing, said channel member receiving said rib in said channel and 30. The assembly of claim 22 wherein said casing includes a rib extending in a direction outwardly and away from said peripheral edge of said panel; said channel member including flange means defining a channel which receives said rib for retaining said channel member on said rib.

31. A vehicular window assembly for installation in a vehicle comprising:
a window panel having a peripheral edge;
a casing molded from resinous plastic material on a first portion of said peripheral edge of said window panel;
an elongated, rigid channel member mounted on and extending along a second portion of said peripheral window panel edge to a transition area where it extends in one piece without interruption onto said casing, said channel member extending along at least a portion of said casing where said channel member is spaced from said window panel; and a finishing strip mounted on and extending along and outwardly away from said channel member;
said casing, channel member and finishing strip adapted to fill spaces between said window panel and the body of the vehicle in which said window assembly is mounted whereby wind noise is reduced when the vehicle is in motion and weather sealing is improved;
said casing including a rib extending in a direction outwardly and away from said peripheral edge of said panel; said channel member including flange means defining a channel which receives said rib for retaining said channel member on said rib;
said rib including an outer surface which begins at a first position at the outer surface of said window panel and extends at an incline from said window panel surface to a second position spaced from said outer window panel surface in a direction along said first portion of said peripheral edge of said window panel; said flange means engaging said second portion of said peripheral edge of said window panel and following said rib outer surface on said casing such that said channel member is spaced from said window panel surface as it extends along said casing.

32. The assembly of claim 31 wherein said flange means include outer and inner flanges, said inner flange being cut away from a predetermined distance along said channel member adjacent said first position whereby said outer flange and channel member can follow said rib outer surface away from said window panel surface without obstruction by said inner flange.

33. The assembly of claim 32 wherein said rib is spaced slightly below said outer surface of said casing; said outer flange of said flange means being positioned and exposed adjacent said outer surface of said casing.

34. The assembly of claim 22 wherein a portion of said channel member is positioned and exposed adjacent an outer surface of said casing for decorative purposes.

35. In a vehicle having a vehicle body, said body having at least one opening therein for receiving a window panel, portions of said vehicle body being adjacent said opening, a window panel having a peripheral edge secured over said opening, and a space between said vehicle body portions and said peripheral edge of said window panel, the improvement comprising:
a casing molded from resinous plastic material on a first portion of said peripheral edge of said window panel and forming a window assembly with said window panel;
trim means for covering and finishing at least a portion of the periphery of said assembly including a second portion of said peripheral edge of said window panel;
said casing including mounting means for mounting said trim means therealong;
said casing and trim means including transition means for extending said trim means in one piece without interruption from said second portion of said peripheral window panel edge where said trim means encapsulates said window panel edge to said mounting means on said casing where said trim means is spaced from said window panel; said casing and trim means together filling said space between said vehicle body portions and said peripheral edge of said window panel whereby wind noise is reduced when said vehicle is in motion and weather sealing is improved.

36. The vehicle of claim 35 wherein said opening is in the front of said vehicle and said window panel is a front windshield at least partially secured to a roof pillar on said vehicle body; said vehicle body portions including a front edge of a door on said vehicle body; said space extending between said front door edge and the side edge of said windshield adjacent said roof pillar.

37. The vehicle of claim 36 wherein said trim means includes an elongated, flexible, resilient finishing strip which resiliently engages said door edge and at least partially covers said space when said door is closed whereby said space along said door edge is covered and sealed.

* * * * *

UNITED STATES PATENT AND TRADEMARK OFFICE
CERTIFICATE OF CORRECTION

PATENT NO. : 4,858,988                               PAGE 1 OF 2
DATED      : August 22, 1989
INVENTOR(S): Cleon C. Morgan and Keith A. Nieboer It is certified that error appears in the above-identified patent and that said Letters Patent is hereby corrected as shown below:

Column 4, line 4:

After "24" insert --lie--.

Column 4, line 7:

"assembly 12" should be --assembly 20--.

Column 4, line 56:

"plane" should be --panel--.

Column 6, line 23:

"78, 78" should be --76, 78--.

Column 7, lines 24 and 25:

"procesesd" should be --processed--.

Column 9, line 5:

"descrihed" should be --described--.

Column 9, claim 1, line 39:

"thereby" should be --whereby--.

UNITED STATES PATENT AND TRADEMARK OFFICE
CERTIFICATE OF CORRECTION

PATENT NO. : 4,858,988

DATED : August 22, 1989

INVENTOR(S) : Cleon C. Morgan and Keith A. Nieboer

It is certified that error appears in the above-identified patent and that said Letters Patent is hereby corrected as shown below:

Column 10, claim 4, line 24:

"from" should be --for--.

Column 13, claim 29, line 48:

Delete "and" and insert therefor --.--.

Column 14, claim 31, line 16:

After "said" insert --outer--.

Column 14, claim 32, line 28:

"from" should be --for--.

Signed and Sealed this

Sixteenth Day of October, 1990

*Attest:*

HARRY F. MANBECK, JR.

*Attesting Officer*     *Commissioner of Patents and Trademarks*